United States Patent
Lancaster-Larocque et al.

(10) Patent No.: US 9,629,271 B1
(45) Date of Patent: Apr. 18, 2017

(54) LASER TEXTURING OF A SURFACE

(71) Applicant: Apple Inc., Cupertino, CA (US)

(72) Inventors: Simon R. Lancaster-Larocque, Gloucester (CA); Sarah J. Montplaisir, Cupertino, CA (US); Collin D. Chan, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 375 days.

(21) Appl. No.: 14/499,142

(22) Filed: Sep. 27, 2014

Related U.S. Application Data

(60) Provisional application No. 61/884,191, filed on Sep. 30, 2013.

(51) Int. Cl.
| | |
|---|---|
| *B23K 26/00* | (2014.01) |
| *H05K 5/03* | (2006.01) |
| *H05K 5/04* | (2006.01) |
| *H05K 5/00* | (2006.01) |
| *B24C 1/06* | (2006.01) |
| *B24C 1/08* | (2006.01) |

(52) U.S. Cl.
CPC .......... *H05K 5/03* (2013.01); *B23K 26/0084* (2013.01); *B24C 1/06* (2013.01); *B24C 1/08* (2013.01); *H05K 5/0004* (2013.01); *H05K 5/04* (2013.01)

(58) Field of Classification Search
CPC ............ B23K 26/0066; B23K 26/0093; B23K 26/362
USPC .................. 347/224, 225; 219/121.6, 121.61, 219/121.68, 121.69, 121.84, 121.85
See application file for complete search history.

(56) References Cited

U.S. PATENT DOCUMENTS

| | | | |
|---|---|---|---|
| 1,608,108 A | 11/1926 | Martus et al. | |
| 2,473,848 A | 8/1947 | Baxter | |
| 2,821,589 A | 1/1958 | Needham | |
| 3,123,792 A | 3/1964 | Klemm | |
| 3,471,663 A | 10/1969 | Farrell | |
| 3,982,917 A * | 9/1976 | Upton | H01S 3/17 65/31 |
| 4,227,059 A | 10/1980 | Ogawa | |
| 4,340,791 A | 7/1982 | Sorenson | |
| 5,180,051 A | 1/1993 | Cook et al. | |
| 5,214,530 A | 5/1993 | Coombs et al. | |
| 5,496,977 A | 3/1996 | Date et al. | |
| 5,523,125 A | 6/1996 | Kennedy et al. | |
| 5,607,607 A * | 3/1997 | Naiman | B23K 26/032 219/121.61 |
| 5,936,213 A | 8/1999 | Biquez et al. | |
| 6,040,543 A | 3/2000 | Mina et al. | |
| 6,084,190 A | 7/2000 | Kenmochi | |

(Continued)

FOREIGN PATENT DOCUMENTS

| | | |
|---|---|---|
| CN | 201945987 | 8/2011 |
| CN | 102725663 | 10/2012 |

(Continued)

OTHER PUBLICATIONS

Jaeger, "Color Solid Ink Printing," imaging.org, 4 pages, at least as early as Sep. 23, 2014.

*Primary Examiner* — Samuel M Heinrich
(74) *Attorney, Agent, or Firm* — Brownstein Hyatt Farber Schreck, LLP

(57) ABSTRACT

A method for manufacturing an enclosure for an electronic device using laser texturing to create a first surface having different surface characteristics than a second surface adjacent to the first surface.

20 Claims, 5 Drawing Sheets

(56) References Cited

U.S. PATENT DOCUMENTS

| | | |
|---|---|---|
| 6,201,196 B1 | 3/2001 | Wergen |
| 6,565,770 B1 | 5/2003 | Mayer et al. |
| 6,591,457 B1 | 7/2003 | Howie, Jr. |
| 6,630,635 B1 | 10/2003 | Doepner |
| 6,667,450 B2 | 12/2003 | Bulin et al. |
| 6,707,358 B1 | 3/2004 | Massman |
| 6,762,381 B2 | 7/2004 | Kunthady et al. |
| 7,101,603 B2 | 9/2006 | Okamura et al. |
| 7,165,846 B2 | 1/2007 | Sannohe |
| 7,297,221 B2 | 11/2007 | Hikita |
| 7,414,213 B2 | 8/2008 | Hwang et al. |
| 7,531,765 B2 | 5/2009 | Komagata |
| 7,727,618 B2 | 6/2010 | Iwano |
| 8,003,200 B2 | 8/2011 | Nashiki et al. |
| 8,232,502 B2 | 7/2012 | Young et al. |
| 8,529,775 B2 | 9/2013 | Costin et al. |
| 8,640,413 B2 | 2/2014 | Ruggie et al. |
| 8,802,220 B2 | 8/2014 | Cao et al. |
| 8,859,920 B2 | 10/2014 | Manullang et al. |
| 8,867,320 B2 | 10/2014 | Suzuki et al. |
| 8,882,280 B2 | 11/2014 | Fukaya et al. |
| 2005/0287301 A1 | 12/2005 | Ljubomirsky |
| 2006/0024476 A1 | 2/2006 | Leland et al. |
| 2009/0237782 A1 | 9/2009 | Takamatsu et al. |
| 2010/0026656 A1 | 2/2010 | Hotelling et al. |
| 2011/0109590 A1 | 5/2011 | Park et al. |
| 2011/0177300 A1 | 7/2011 | Hankey et al. |
| 2013/0084430 A1 | 4/2013 | Hill et al. |
| 2013/0112536 A1 | 5/2013 | Shah et al. |
| 2013/0120314 A1 | 5/2013 | Ishibashi et al. |
| 2013/0140746 A1 | 6/2013 | Heverly et al. |
| 2014/0363608 A1* | 12/2014 | Russell-Clarke .. B23K 26/0066 428/66.7 |
| 2015/0062709 A1 | 3/2015 | Matsuyuki et al. |
| 2015/0064432 A1 | 3/2015 | Matsuyuki et al. |

FOREIGN PATENT DOCUMENTS

| | | |
|---|---|---|
| CN | 202632259 | 12/2012 |
| CN | 202649955 | 1/2013 |
| CN | 202854790 | 4/2013 |
| CN | 203366304 | 12/2013 |
| CN | 103902122 | 7/2014 |
| DE | 102010006665 | 8/2011 |
| EP | 0424173 | 4/1991 |
| GB | 581824 | 10/1946 |
| GB | 957644 | 5/1964 |
| JP | 201410814 | 1/2014 |
| WO | WO01/34408 | 5/2001 |
| WO | WO2011/076294 | 6/2011 |

* cited by examiner

LASER TEXTURING OF A SURFACE

CROSS-REFERENCE TO RELATED APPLICATION

This application is a nonprovisional patent application of and claims the benefit to U.S. Provisional Patent Application No. 61/884,191, filed Sep. 30, 2013 and titled "Laser Texturing of a Surface," the disclosure of which is hereby incorporated by reference herein in its entirety.

TECHNICAL FIELD

Embodiments of the invention disclosed herein relate generally to surface finishes for electronic enclosures and methods for texturing the surfaces of those enclosures.

BACKGROUND

The market for electronic devices, and particularly the individual consumer market, is extremely competitive. In order to increase sales, manufacturers of those electronic devices seek to make the outward appearance of those devices as pleasing to potential consumers as possible. While highly light reflective, very smooth, external surfaces on certain devices may be desirable, it has become increasingly popular to texture at least portions of the external surfaces of electronic devices to both minimize light glare and to provide for better gripping surfaces. In addition, texturing surfaces operates to hide minor defects or flaws in the surface of the device. This has the double effect of increasing eye appeal and reducing the incidence of dropping those devices by users, particularly where the devices are hand-held devices.

Various abrasive blasting techniques are known to texture surface materials. Bead blasting is one known technique which removes portions of a surface by directing fine beads of material at high pressure against the surface to be textured. For example, utilizing bead blasting on an aluminum surface produces a textured effect on that surface. This textured effect reduces light glare thereby producing a desirable "finished" look to various enclosures for electronic devices as well as providing a better gripping surface. While suitable for many applications, the use of bead blasting or other types of abrasive blasting methods has limitations in that those techniques are not precise. For example, in bead blasting, directing the stream of beads to texture the surface is not precisely controlled. This lack of precision may make abrasive techniques suitable for large surfaces while limiting their use on small surfaces such as buttons or even use on large surfaces where less than the entire surface is to be ablated. For example, where texturing is desired around lettering or other decorative surfaces, it is not cost effective or technically feasible to abrasively blast the surface around such lettering while leaving the lettering untouched. Even micro-abrasive blasting may lack sufficient control to create a texture around a small letter or in between letters of a word, while leaving the individual letters untouched. Thus, for example, to use blasting techniques may require that the lettering be masked which can be difficult or impossible, depending upon the size of the mask and its proximity to nearby masks. In addition, the mask may be prone to damage or destruction during the blasting process, thereby resulting in an unsatisfactory finish to the then exposed portions of the surface. The problem with masking is made even more difficult when the mask is very small or has a complex configuration.

Accordingly, an improved method and/or system for texturing an exterior of an electronic device may be useful.

SUMMARY

Laser etching processes may remove material from a solid surface in a controlled fashion via an ablation or other material removal technique. Laser etching may be suitable to provide a textured surface on many materials such as aluminum. Also, because ablation may use laser pulses having a short time duration, a laser may be used to remove material quickly. In some cases, because the surrounding material absorbs very little heat, laser texturing can also be used on delicate or heat-sensitive materials such as polymers or composite materials. Additionally, because the process is gentler than abrasive blasting techniques, materials such as carbon fiber composite materials can also be subjected to laser texturing without damage to surrounding material structure. In addition, laser texturing can produce a surface that is even more textured than can be produced using abrasive blasting techniques.

In some embodiments, a laser etching apparatus includes a laser and a controller. The laser beam may trace patterns onto the surface. The controller (e.g., a computer) may control the duration, direction, intensity, speed of movement, and spread of the laser beam aimed at the surface. Different patterns can be engraved by programming the controller to traverse a particular path for the laser beam over time. In some implementations, the trace of the laser beam may be carefully regulated to achieve a desired removal depth of material. Duplicate laser paths may be avoided to ensure that each portion of the surface is exposed to the laser only once, so the desired amount of material is removed. The speed at which the beam moves across the material may be important when creating textured surfaces. Also, variations in the intensity and spread of the beam may also affect the texture. For example, by changing the proportion of time the laser is turned on during each pulse (also known as "duty-cycle"), the power delivered to the surface can be controlled appropriately for the material. Since the position of the laser may be precisely controlled, it may not be necessary to add barriers or masks to the surface to prevent the laser from deviating from the prescribed engraving pattern. Thus, as opposed to blasting techniques described above, no mask is needed in laser etching.

One example embodiment is directed to a method for generating a surface on an item. An external surface of the item may be finished, including a first surface portion and a second surface portion. The second surface portion may be adjacent to the first surface portion. At least a part of the first surface portion may be laser etched. In some cases, a first surface portion has a different texture than the second surface portion. In some cases, the step of finishing includes the step of polishing at least a part of the external surface. In some cases, the step of finishing includes the step of bead blasting at least a part of the external surface. In some cases, the second surface portion is configured in a predetermined shape.

Some example embodiments further include the step of laser etching the external surface including the first surface portion and the second surface portion. In some cases, the item includes an enclosure for an electronic device. In some embodiments, the item includes an aluminum enclosure.

The method may include programming a computer to control the laser. For example, the step of laser etching may include programming a computer to control the laser etching. In some cases, the step of programming includes directing the step of laser etching to emulate a bead blasted texture. In some cases, the step or programming a computer includes the step of generating a surface texture according to a random number sequence. The first surface portion and the second surface portion may each include multiple discrete surface portions.

Some example embodiments are directed to a method for manufacturing an enclosure for a device including a first surface portion and a second surface portion. A part of the first surface portion may be bead blasted and a remaining part of the first surface portion may be laser etched to produce a surface having different surface characteristics than the second surface portion.

Some example embodiments include an electronic device having an exterior portion including a first surface portion and a second surface portion adjacent to the first surface portion. The first surface portion may have been laser etched such that it has a more random texture than the second surface portion.

DETAILED DESCRIPTION

Generally, embodiments described herein disclosure systems and methods for imparting a texture to an enclosure for an electronic device. The imparted texture may alter one or more optical properties of the enclosure, such as reflectivity, brightness, color, and the like. The imparted texture may, or may not, cause the enclosure to feel different, have a different coefficient of friction with respect to a user touching or gripping the enclosure, and so forth. For example, the texture may permit a user to more easily pick up and handle an enclosure by making it less slick and/or slippery.

The texture may be generated by ablating or melting certain portions of the enclosure, for example through application of energy in the form of a pulsed laser. The ablated/melted regions may appear less reflective and may refract incident light rather than reflect it. The speed, pulse rate, wavelength, pattern, motion, beam diameter, intensity, power density, and the like of the laser may all be varied either randomly or according to a pattern to generate a desired texture. In some embodiments, the generated texture may be repeated at a small scale (e.g., on the order or microns to millimeters) or at a larger scale. On a small scale, the repeating pattern, when repeated across the surface of the enclosure, may appear random or semi-random to the human eye.

Figure 1:
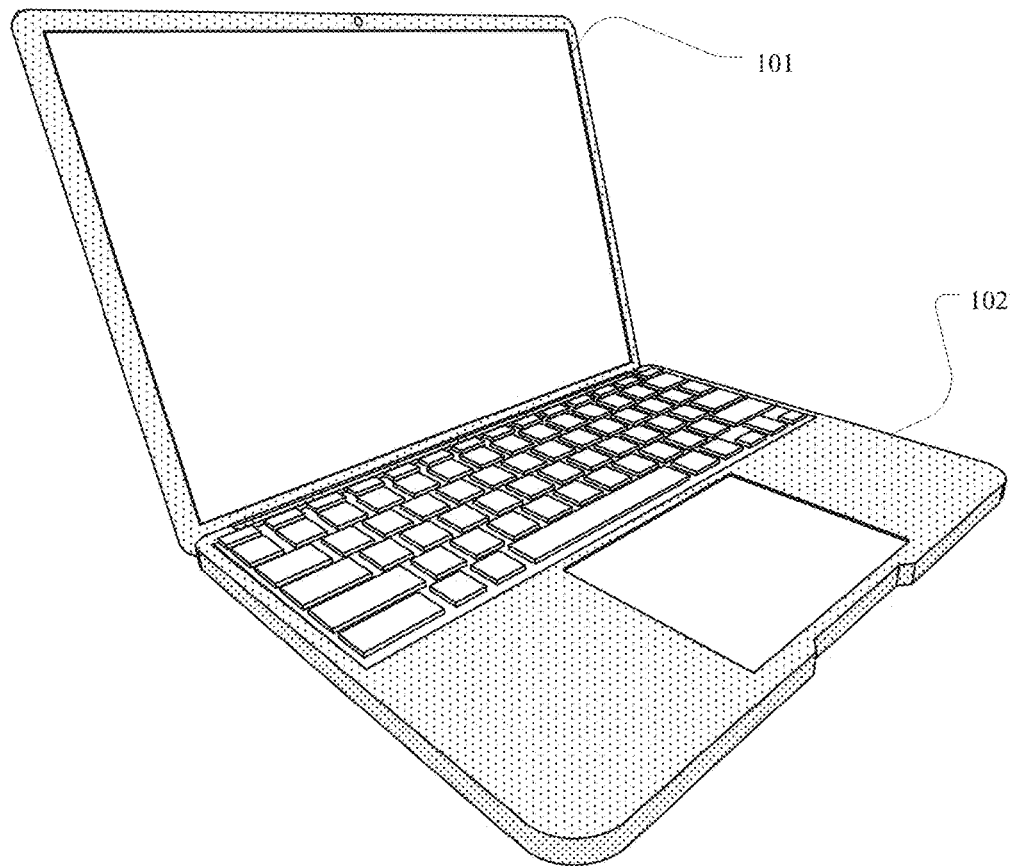
FIG. 1 is a perspective view of the front of a laptop computer having a textured surface.

Referring to FIG. 1 and wherein like reference numbers denote like structure throughout the specification, a perspective view of an electronic device such as a laptop computer device 100 is shown. The device includes a cover portion 101 and a base portion 102. Cover portion 101 and base portion 102 may be made of a material such as aluminum, which may be anodized. In other embodiments, a different metal may be used, or a composite material, polymer, or the like may be used. As one non-limiting example, a carbon fiber-reinforced polymer may be used to form at least a portion of the enclosure. Any or all of these materials may be used, or combined, to form the enclosure. Likewise, the texturing methods and systems discussed herein may be applied to any such material.

Figure 2:
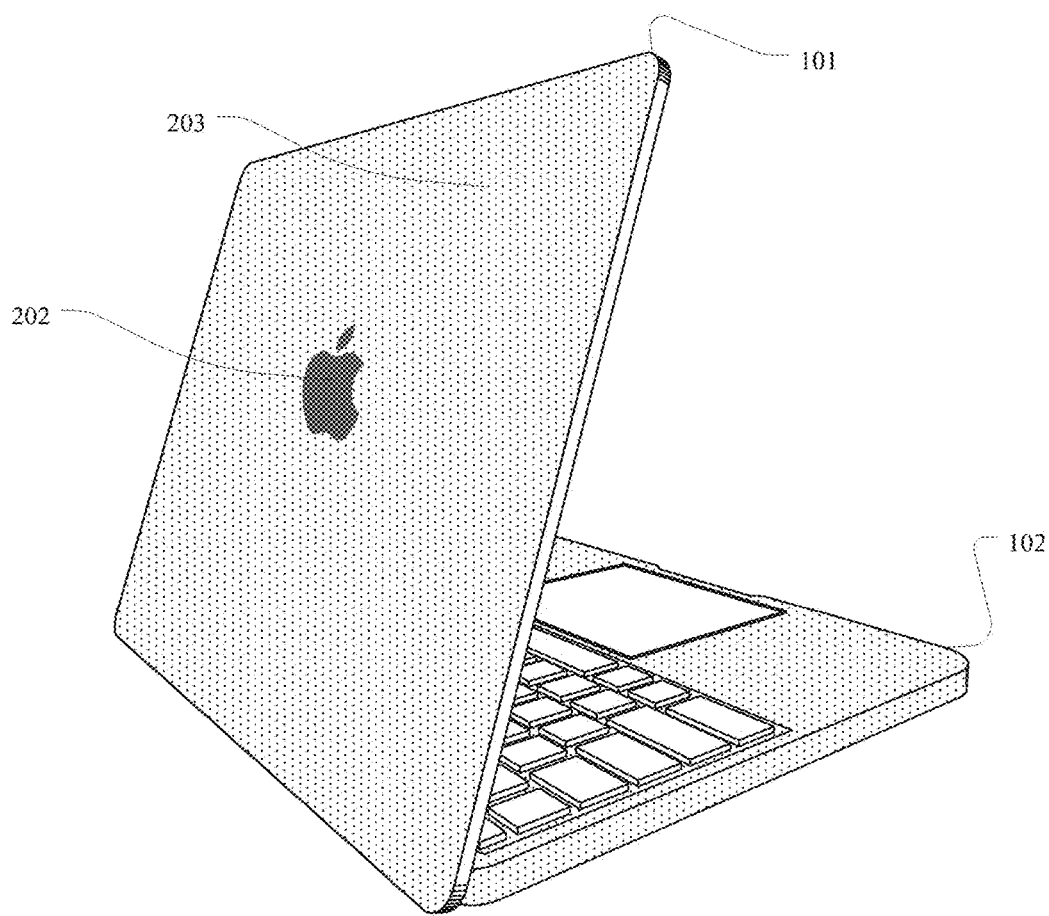
FIG. 2 is a perspective view of a laptop computer having a textured surface.

It should be appreciated that the electronic device may vary from embodiment to embodiment. The electronic device may be, for example, a phone or other communication device, a tablet computing device, a laptop or other portable computer, a desktop computer, an input device, an output device, a display, a wearable device, and so on. Further, the methods described herein may be applied to other devices and structures, such as appliances, automobiles, walls, furniture, and so on. Referring to FIG. 2, cover portion 101 is shown partially open and extending from base portion 102. A first portion 202 of upper surface 201 is textured to provide a matte appearance. A second portion 203 of upper surface 201 adjacent to the first surface 202 includes a surface which is smoother than first surface portion 202 such that the surface of second portion 203 is comparatively more light reflective than the surface of first portion 202. First surface portion 202 may be laser textured according to the invention such that first surface portion 202 visually presents a matte finish and is easier for a user to grasp due to the roughness of first surface portion 202. The entire surface comprising first surface portion 202 and second surface portion 203 may be polished smooth prior to laser texturing such that laser texturing only first portion 202 results in second portion 203 retaining the smooth and reflective appearance. A laser or other polishing technique may be used to polish first and second portions 202 and 203.

In other embodiments, the entirety of the cover portion 101 and/or base portion 102 may be laser textured. Thus, the whole of the enclosure, or the whole of the cover and/or base, may have a uniform appearance That is, for certain applications, it may be desirable to present a uniform textured surface. In that situation, laser etching may be used to present a uniform texture of a desired random or other pattern which may include a uniform or nonuniform light reflective surface. In some cases, the laser texturing may simulate or resemble a sand or bead-blasting process.

Figure 3:
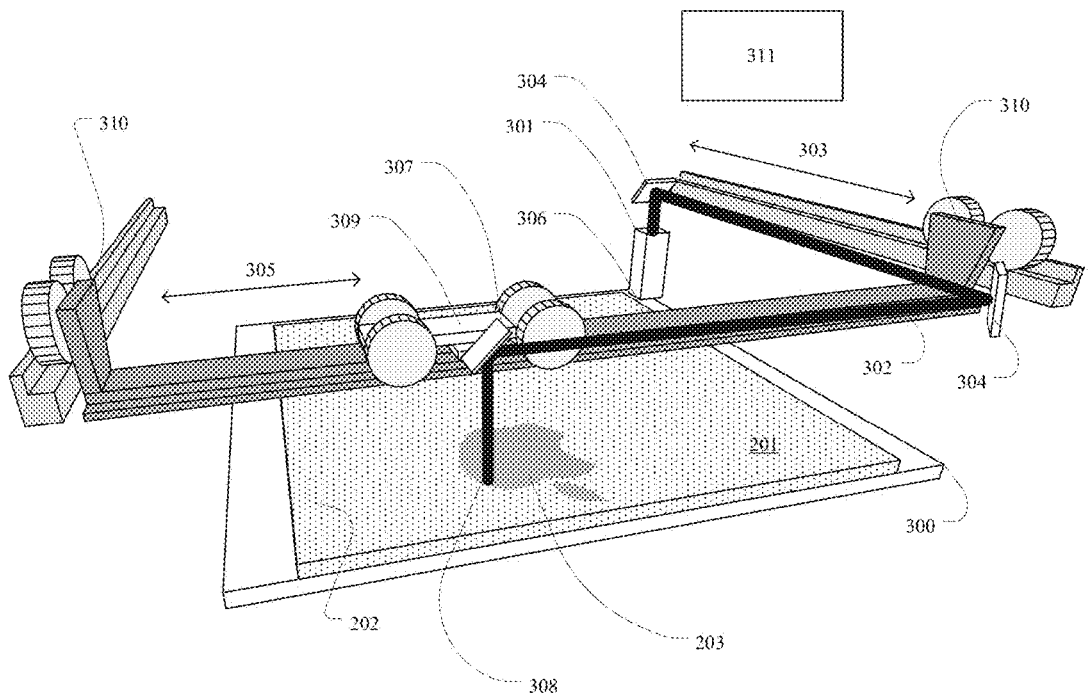
FIG. 3 is a perspective view of a laser texturing apparatus.

Referring to FIG. 3, a perspective view of an example laser table 300 is shown. In this example, a laser 301 is affixed to the side of the table 300 and emits light beam 302 perpendicular to one y-axis 303 of table 300 toward a minors 304 which are mounted at 45 degree angles such that the laser beam 302 is redirected along an x-axis path 305 parallel with the length of the rail 306 toward mirror 307. Beam 302 is then reflected by minor 307 to direct the beam 302 perpendicular to the plane of first and second axes 303 and 305 downward toward table 300 and contacting surface 201 at point 308. Mirror 307 is mounted on a movable trolley 309 which may be moved along rail 306. Rail 306 is itself mounted on movable trolleys 310 so that every point of the table surface 300 can be swept by the laser beam 302. That is laser beam 302 may be directed against upper surface 201 of cover portion 101 along both axes 303 and 305 to allow movement of laser beam 302 in both the y- (303) and x-axis (305) directions on table 300. The movement of trolleys 309 and 310 is preferably controlled by a computer 311 which may be connected to motors (not shown) which drive trolleys 309 and 310. In this arrangement, computer 311 may be programmed to provide precise movement of laser beam 302 along axes 303 and 305 and thus move contact point 308 to any position on cover surface 201. The addition of another motor on trolley 309 to allow movement of mirror 307 with respect to rail 306 along the axes 303 and 305 would allow the controller 311 to move beam 302 at an angle to surface 201 such that the pitch and angle at which beam 302 contacts surface 201 could be varied thereby producing pitch and angle etching at contact point 308 to further vary the texture of surface 201 being etched.

Various embodiments allow the use of laser etching in lieu of abrasive blasting, such as bead blasting, to texture the exterior surface of an electronic device. Because laser etching can be controlled more precisely than abrasive bead blasting, these embodiments permit a first surface of a device to be etched such that second surfaces may remain unetched and thus present a different appearance and feel than the first etched surface. Laser etching may also be used on entire surface 201 and varied in its application such that laser etching produces differently textured first 202 and second 203 surfaces.

Figure 4:
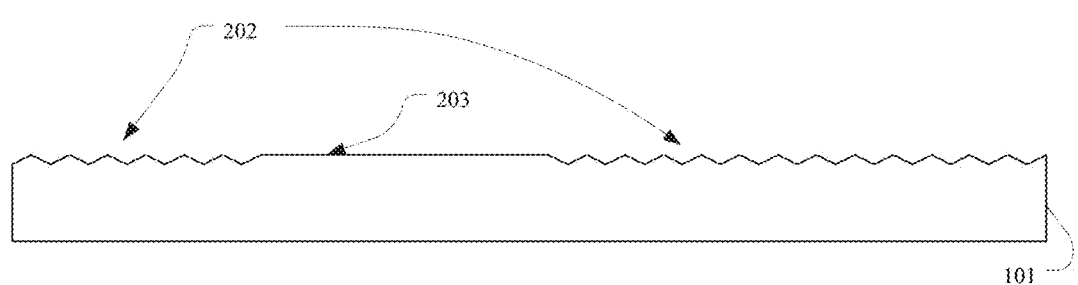
FIG. 4 is a side sectional view illustrating a surface with a first textured and a second untextured portion.
Figure 5:
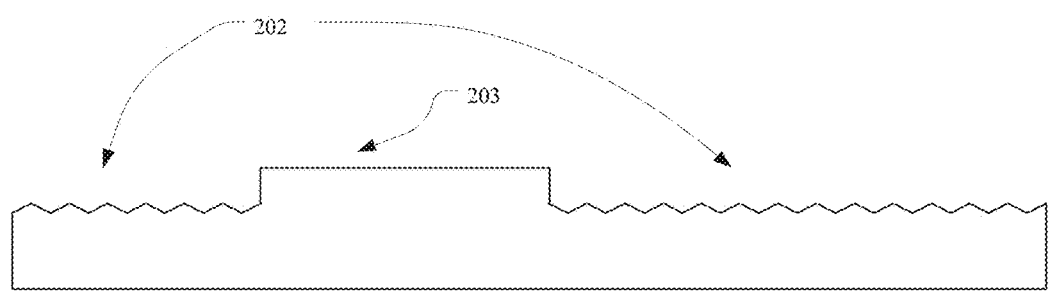
FIG. 5 is a side sectional view illustrating a surface with a first textured surface extending above a second untextured surface.
Figure 6:
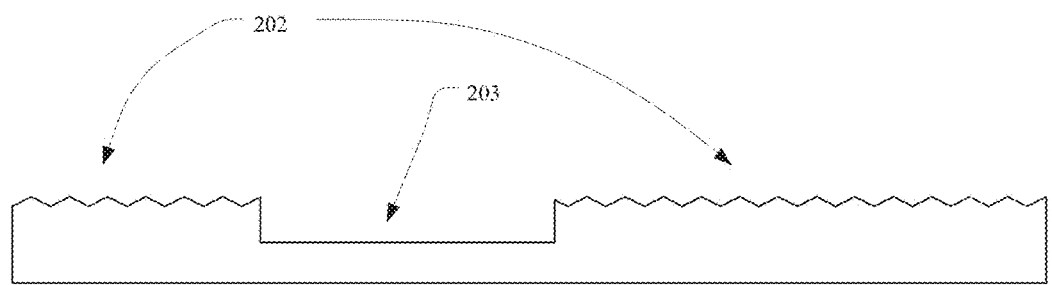
FIG. 6 is a side sectional view illustrating a surface with a first textured surface recessed below a second untextured surface.

Referring to FIGS. 4, 5, and 6, the first surface 202 is shown as an uneven textured surface while second surface 203 is shown as a smoother untextured surface. In FIG. 4, surfaces 202 and 203 are shown as relatively the same height such that neither surface extends significantly above or below the other. One way this embodiment may be achieved is to laser etch across the surface 203 to produce textured first surface 202 and untextured or reflective surface 203. The laser etching may be accomplished by programming computer 311 to remove approximately the same amount of material from surface 201 during the etching process. In FIG. 5, the second surface 203 is shown extending above first surface 202. In one example, the surface 201 is first polished and then laser etching is used to produce first textured surface 202. The removal of material from surface 201 in the area of first surface 202 may result in the second surface 203 extending above first surface 202. Referring to FIG. 6, laser etching may be used such that more material is removed from reflective second surface 203 during the etching process and textured first surface 202 extends above second surface 203 such that second surface 203 is recessed into surface 201.

Because of the precise control of a laser etching machine by a computer 311, the second unetched surface 203 to be configured in the form of lettering or other symbols may remain polished which would not be permitted by more uncontrolled techniques such as abrasive bead blasting. Because it is uncontrolled, some traditional abrasive bead blasting processes require the use of a mask if certain surfaces are to remain unablated or untextured. When the surfaces to remain unablated are of complex or intricate design or are relatively small in size, the use of masking becomes complicated in that the mask must be precisely configured to protect the surface to be ablated and this introduces an additional complex step into the process. In addition, a mask may be damaged or destroyed by the uncontrolled bead blasting which then affects the condition of the underlying surface below the mask. If that underlying surface is polished, damage to the mask may result in blasting the surface to be protected and does not preserve the surface differences in first portion 202 and second portion 203.

Due to the precision nature of a laser etching process, a surface finish may be created on a surface of a part adjacent to a portion having a different surface finish without the use of a mask or shield. Thus, very intricate patterns may be formed using a laser that would be difficult or impossible using a traditional mask.

Laser etched surfaces refract light on a nanometer scale which can produce a dull or matte finish to the textured surface. Laser etching may also be used in such a manner as to impart a polished surface look. Thus, the entire surface may be highly polished by laser etching or other means prior to laser texturing and the precise movement of the laser texturing process will allow the highly polished smooth surface to remain and present a mirrored or polished appearance by reflecting more light. In addition, because laser etching or texturing is a more controlled process, laser texturing may be controlled to present a more randomly textured surface appearance than using conventional bead blasting techniques. For example, the computer 311 which controls the laser etching process may be programmed using random number generation software such that the laser textured surface will be completely random and the laser cuts in the surface will not be produced in any repeatable pattern which could be detected visually by an observer. Conventional bead blasting may, in some cases, create a repeatable pattern. Thus, the textured surface appearance using laser texturing can be made a truly random pattern Alternatively, computer 311 may be programmed to produce a surface which may repeat on a nanometer scale but which appears to the naked eye of an observer to be random on a macro scale. It may be useful to use laser etching to emulate the look of bead blasting in some applications.

It may also be advantageous to use bead blasting in combination with laser etching. For example, bead blasting may be used on a majority of the surface area of first surface 202 while the portion of first surface 202 adjacent to second surface 203 is not subjected to bead blasting. Rather, laser etching may be utilized to produce the desired textured surface in the area surrounding second surface 203. Thus, computer 311 may be programmed to produce a laser etched surface in the area surrounding second surface 203 which may emulate a bead blasted surface such that the portion of first surface 202 which was laser etched may appear to the eye of an observer to have the same finish as the portion of first surface 202, which was bead blasted. In this manner, the entire area of first surface 202 may appear to have been subject to bead blasting when, in fact, laser etching had been used for a portion of that surface area of first surface 202.

An additional drawback of bead blasting surfaces is that its use on small surface features such as buttons is limited. For example, in instances where second surface 203 is very small in comparison to first surface 202 and where second surface 203 is to be textured leaving first surface 202 as the polished surface, the use of the bead blasting process to produce the textured surface on second surface 203 to create the button may be difficult. While it may be possible to use bead blasting on entire surface 201 and then use laser etching to create a relatively smooth surface on first surface portion 202, this method may result in the laser etched smooth surfaces being below the bead blasted surface because laser etching removes additional material. Thus, the letters or other symbol on the surface may not be embossed but rather recessed into the bead blasted surface. However, if the letter or symbol is desired to be recessed, this technique may be utilized Another possible implementation of laser etching, in accordance with the present disclosure, includes laser etching both first surface 202 and second surface 203. Thus, in some cases, the computer 311 may be programmed to produce a random-looking textured surface on first surface 202 and a smoother reflective surface on second surface 203, or vice versa. In this embodiment, the intensity and direction of laser 301 may be controlled by computer 311 such that different surface characteristics may be achieved as contact point 308 of laser beam 302 moves across surface 201 in both the y- (303) and x-axis (305) directions. By varying the duty-cycle of laser 301, the amount of material melted or ablated may be varied to produce the desired surface characteristics. In addition, by varying the angle at which laser beam contact point 308 is incident on surface 201, additional surface characteristics may be achieved. With this approach, the relative height levels of first surface 202 and second surface 203 may be varied such that first surface 202 may extend above, below or at the same height level as second surface 203. For example, referring to FIGS. 4, 5, and 6, side sectional views through surface 201 is shown. In FIG. 4, the first surface 202 and the second surface 203 are at approximately the same level. In FIG. 5, second surface 203 extends above first surface 202, while in FIG. 6, the second surface 203 is below the level of first surface 202. While second surface 203, as shown in FIGS. 4, 5, and 6, may be smoother and more light reflective than first surface 202, it may be appreciated that second surface 203 could also be laser etched such that it is rougher than first surface 202 in a desired application.

Figure 7:
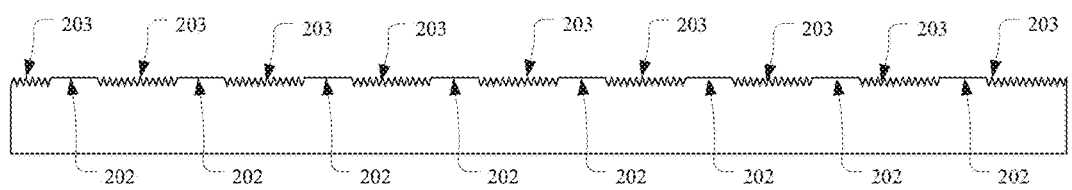
FIG. 7 is a side sectional view illustrating a surface with alternating textured and untextured portions.

Referring to FIG. 7, a side sectional view through surface 201 is shown with alternating first textured surfaces 202 and second untextured surfaces 203. That is, leaving relatively small untextured surfaces portions 203 between textured first surface portions 202 may increase the reflection and/or lighten the appearance of surface 201 such that the appearance to an observer may be enhanced. The technique disclosed herein may be used on metal surfaces such as aluminum which may then be anodized or which may be anodized prior to the laser etching. Because laser etching removes material quickly and the surrounding material absorbs very little heat, laser texturing can also be used on delicate or heat-sensitive materials such as polymers or composite materials. Because the process is gentler than abrasive blasting techniques, materials such as carbon fiber composite materials can also be subjected to laser texturing without damage to surrounding material structure.

The foregoing has been generally described with respect to particular embodiments and methods of manufacture. It will be apparent to those of ordinary skill in the art that certain modifications may be made without departing from the spirit or scope of this disclosure. For example materials other than those metals, plastics or composites may be utilized for the cover portion to be laser etched without departing from the spirit or scope of the disclosure. Accordingly, the proper scope of this disclosure is set forth in the following claims.

What is claimed is:

1. A method for generating a surface on an item comprising the steps of:
   finishing an external surface of said item including a first surface portion and a second surface portion, said second surface portion adjacent to said first surface portion, and
   laser etching at least a part of said first surface portion to create a random texture.

2. The method according to claim 1, wherein a said first surface portion has a different texture than said second surface portion.

3. The method according to claim 1, wherein said step of finishing includes the step of polishing at least a part of said external surface.

4. The method according to claim 1, wherein said step of finishing includes the step of bead blasting at least a part of said external surface.

5. The method according to claim 1, further including the step of laser etching said external surface including said first surface portion and said second surface portion.

6. The method according to claim 1, wherein said item includes an enclosure for an electronic device.

7. The method according to claim 1, wherein said second surface portion extends above said first surface portion.

8. The method according to claim 1, wherein said second surface portion is recessed below said first surface portion.

9. The method according to claim 1, wherein said first and second surface portions are approximately coplanar.

10. The method according to claim 1, wherein said first surface portion includes a rough matte finish.

11. The method according to claim 10, wherein said second surface portion is highly light reflective.

12. The method according to claim 1, wherein said second surface portion is configured in a predetermined shape.

13. The method according to claim 1, wherein said item includes an aluminum enclosure.

14. The method according to claim 1, wherein said step of laser etching includes programming a computer to control said laser etching.

15. The method according to claim 14, wherein said step of programming includes directing said step of laser etching to emulate a bead blasted texture.

16. The method according to claim 14, where said step or programming a computer includes the step of generating a surface texture according to a random number sequence.

17. The method according to claim 1, wherein said first surface portion and said second surface portion each include multiple discrete surface portions.

18. A method for manufacture of an enclosure for a device including a first surface portion and a second surface portion adjacent to the first surface portion, said method comprising the steps of:
   bead blasting a part of said first surface portion to produce a bead blasted texture; and
   laser etching the second surface portion to produce a laser-etched texture that emulates the bead blasted texture.

19. The method of claim 18, wherein a third portion of the surface is adjacent to the first and second portions, and wherein the third portion having different surface characteristics than said first and second surface portions.

20. An enclosure for an electronic device comprising:
   an exterior portion including a first surface portion and a second surface portion;
   said second surface portion adjacent to said first surface portion, and
   said first surface portion having been laser etched such that it has a more random texture than said second surface portion.

* * * * *